United States Patent
Chen et al.

(10) Patent No.: US 10,402,699 B1
(45) Date of Patent: Sep. 3, 2019

(54) AUTOMATED CLASSIFICATION OF IMAGES USING DEEP LEARNING—BACK END

(71) Applicant: HRL Laboratories, LLC, Malibu, CA (US)

(72) Inventors: Yang Chen, Malibu, CA (US); Deepak Khosla, Camarillo, CA (US); Fredy Monterroza, Malibu, CA (US); Ryan M. Uhlenbrock, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 315 days.

(21) Appl. No.: 15/380,120

(22) Filed: Dec. 15, 2016

Related U.S. Application Data

(60) Provisional application No. 62/268,498, filed on Dec. 16, 2015.

(51) Int. Cl.

| | | |
|---|---|---|
| *G06K 9/66* | (2006.01) | |
| *G06K 9/62* | (2006.01) | |
| *G06T 7/277* | (2017.01) | |
| *G06T 3/40* | (2006.01) | |
| *G06T 7/90* | (2017.01) | |
| *G06K 9/42* | (2006.01) | |
| *G06N 3/04* | (2006.01) | |
| *G06N 3/08* | (2006.01) | |

(52) U.S. Cl.
CPC ............ *G06K 9/66* (2013.01); *G06K 9/42* (2013.01); *G06K 9/6256* (2013.01); *G06N 3/04* (2013.01); *G06N 3/08* (2013.01); *G06T 3/40* (2013.01); *G06T 7/277* (2017.01); *G06T 7/90* (2017.01); *G06T 2207/10024* (2013.01); *G06T 2207/20081* (2013.01)

(58) Field of Classification Search
CPC .......... G06K 9/66; G06K 9/6256; G06K 9/42; G06N 3/08; G06N 3/04; G06T 7/90; G06T 3/40; G06T 7/277; G06T 2207/10024; G06T 2207/20081
USPC ........................................................ 382/157
See application file for complete search history.

(56) References Cited

U.S. PATENT DOCUMENTS

| | | | |
|---|---|---|---|
| 9,430,766 B1* | 8/2016 | Kraft .................... | G06Q 20/352 |
| 2006/0056704 A1* | 3/2006 | Bachmann .......... | G06K 9/0063 |
| | | | 382/224 |

FOREIGN PATENT DOCUMENTS

WO    WO-2015157526 A1 * 10/2015 ............... G06N 3/08

* cited by examiner

*Primary Examiner* — Amandeep Saini
(74) *Attorney, Agent, or Firm* — Lewis Roca Rothgerber Christie, LLP

(57) ABSTRACT

A method for training an automated classifier of input images includes: receiving, by a processing device, a convolution neural network (CNN) model; receiving, by the processing device, training images and corresponding classes, each of the corresponding classes being associated with several ones of the training images; preparing, by the processing device, the training images, including separating the training images into a training set of the training images and a testing set of the training images; and training, by the processing device, the CNN model utilizing the training set, the testing set, and the corresponding classes to generate the automated classifier.

22 Claims, 10 Drawing Sheets
(8 of 10 Drawing Sheet(s) Filed in Color)

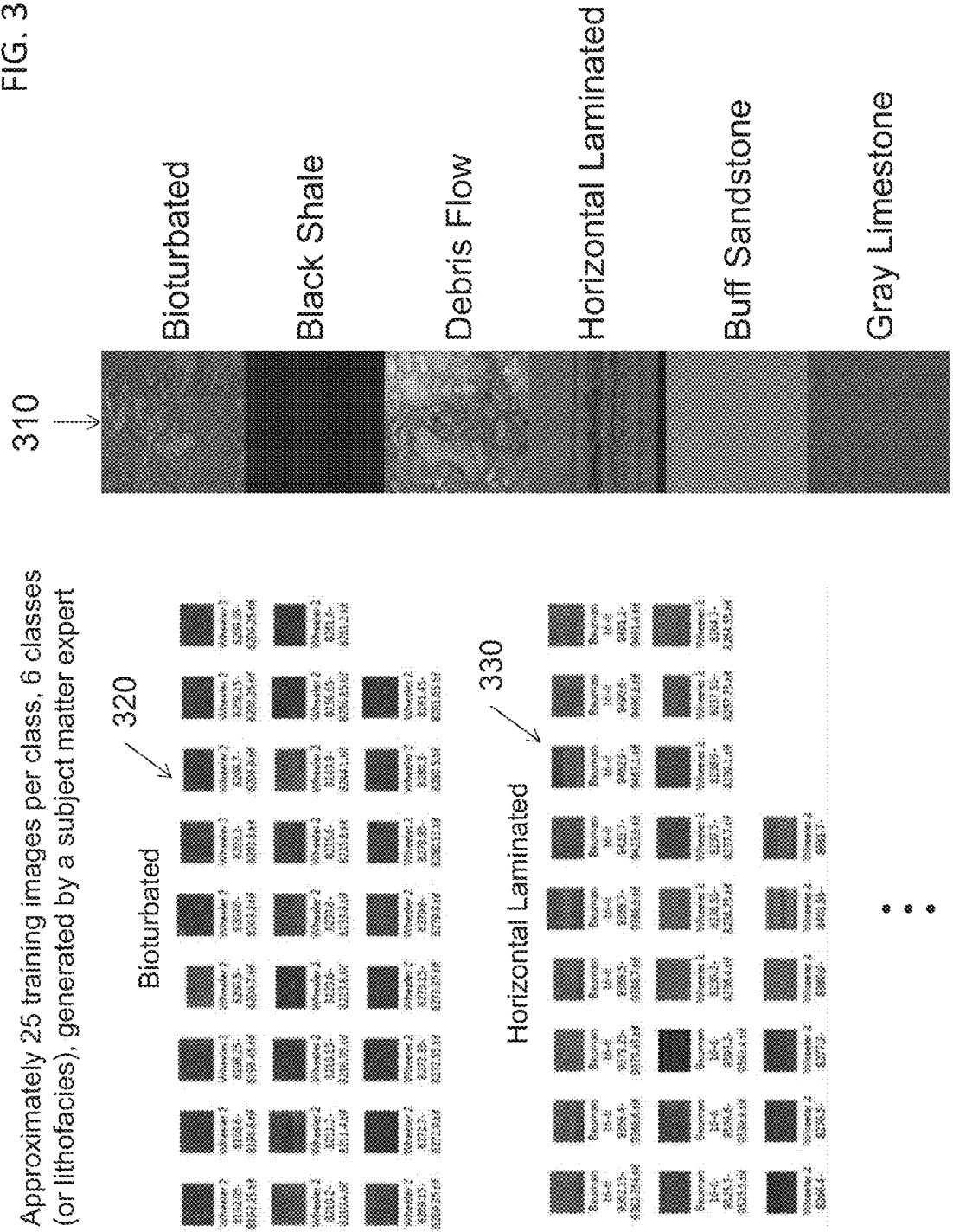

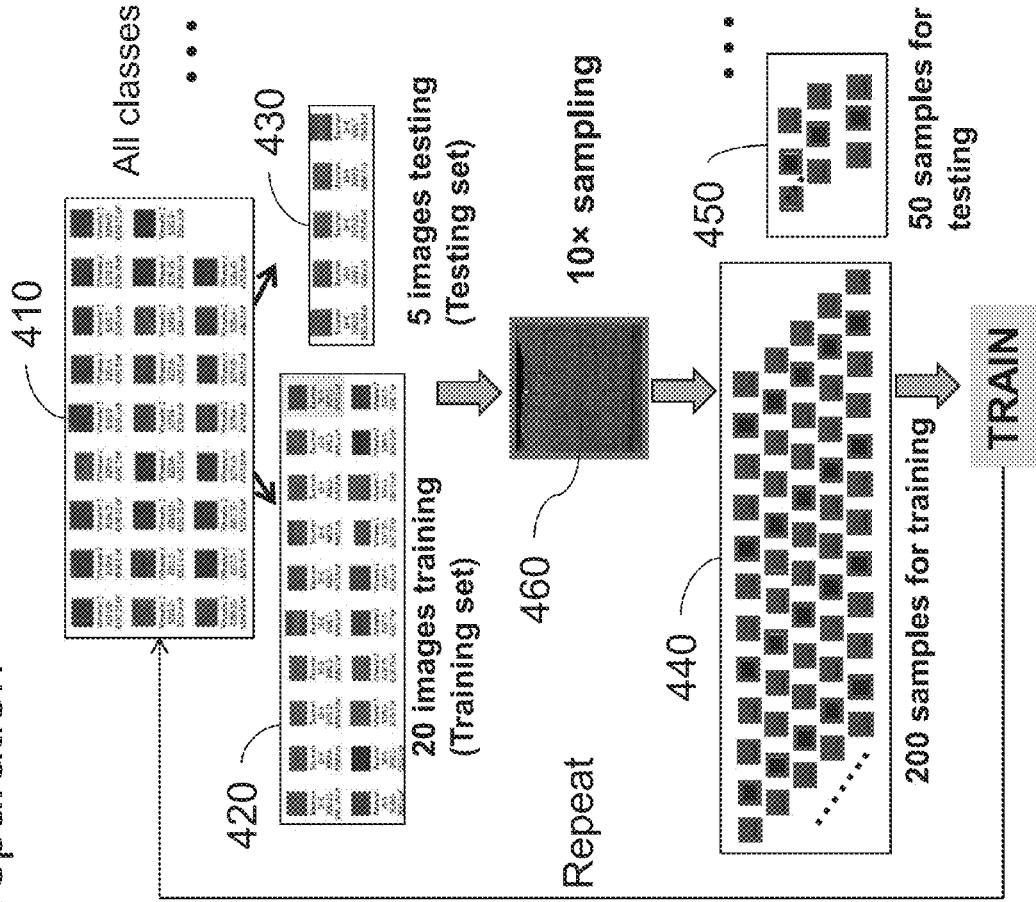

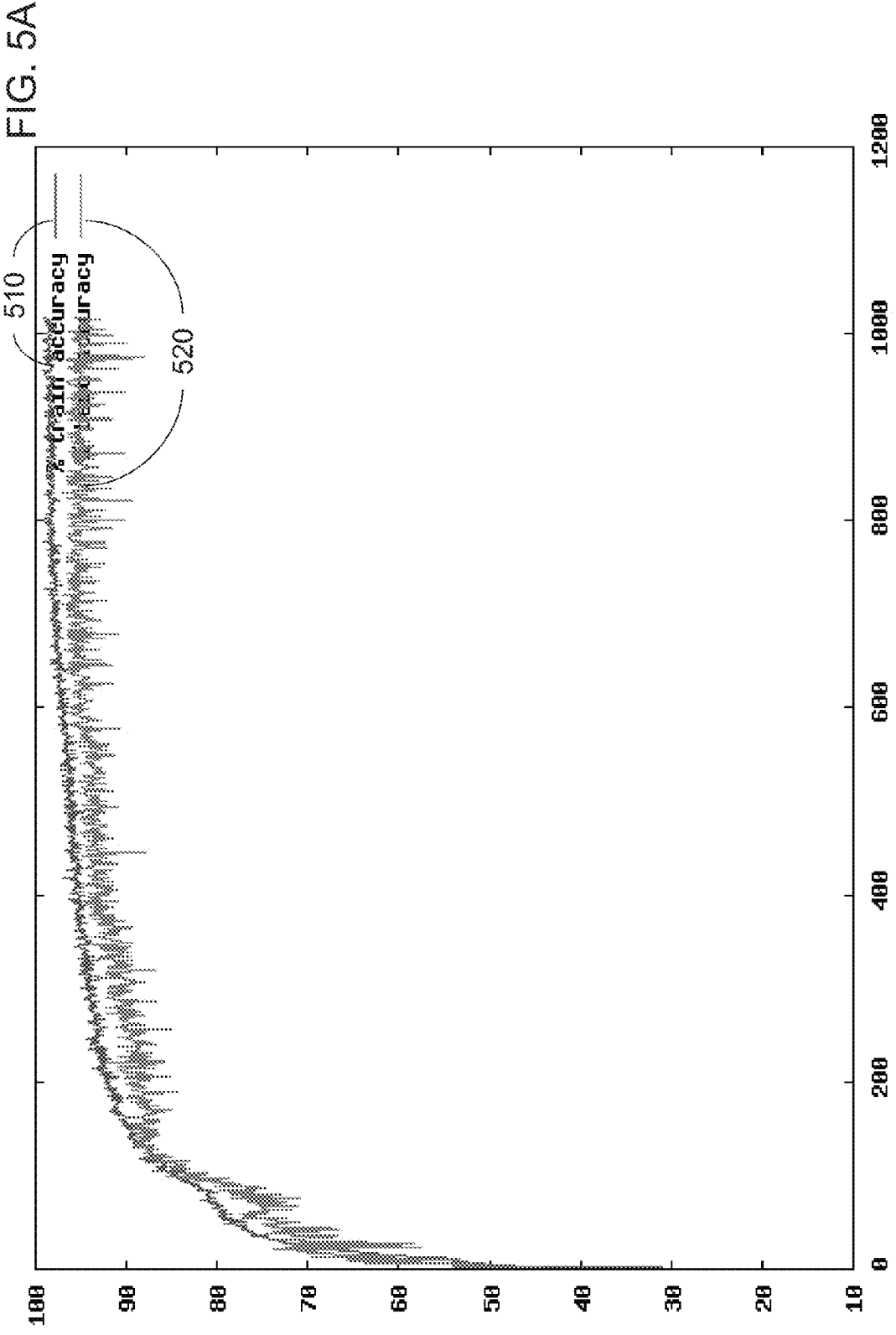

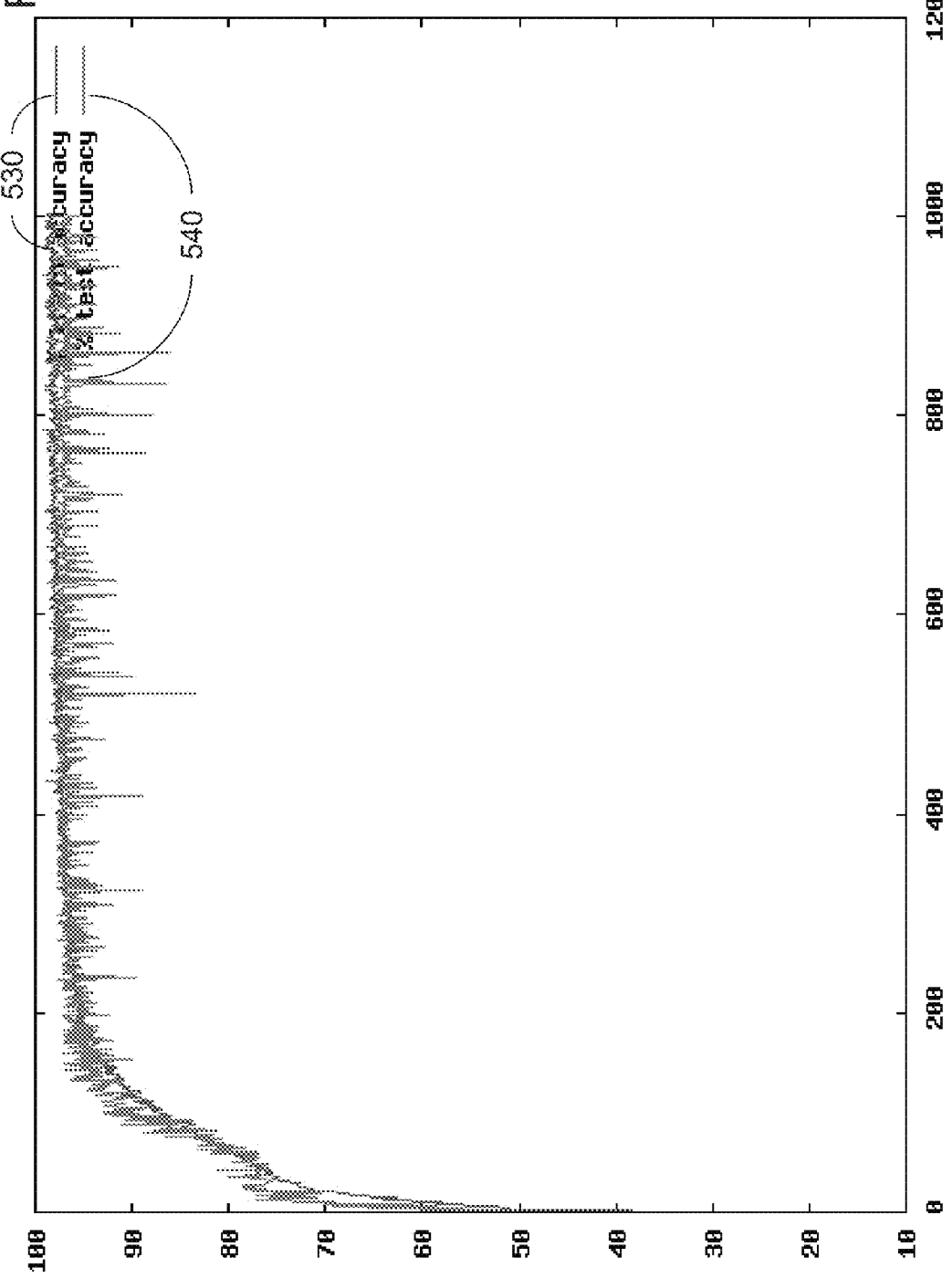

FIG. 5C

Best performing CNN from select training runs:

Classification results

Run Fold 5

ConfusionMatrix:

```
[[ 50   0   0   0   0   0]    [class: Bioturbated]       ⎫
 [  0  50   0   0   0   0]    [class: BlackShale]        ⎪
 [  0   0  60   0   0   0]    [class: DebrisFlow]        ⎬ Ground-
 [  0   0   0  40   0   0]    [class: HorizLaminated]    ⎪ truth label
 [  0   0   3   0  47   0]    [class: GreyLimestone]     ⎪
 [  0   0   0   0   0  40]]   [class: BuffSandstone]     ⎭
```

+ average row correct: 98.9999999602064%
+ global correct: 98.9655172413793%

Classification results per class:
- 100.000%
- 100.000%
- 100.000%
- 100.000%
- 94.000%
- 100.000%

Run Fold 2

ConfusionMatrix:

```
[[ 50   0   0   0   0   0]    [class: Bioturbated]       ⎫
 [  0  50   0   0   0   0]    [class: BlackShale]        ⎪
 [  0   0  70   0   0   0]    [class: DebrisFlow]        ⎬ Ground-
 [  1   0   0  44   5   0]    [class: HorizLaminated]    ⎪ truth label
 [  0   0   0   3  47   0]    [class: GreyLimestone]     ⎪
 [  0   0   0   0   0  50]]   [class: BuffSandstone]     ⎭
```

+ average row correct: 96.9999988079071%
+ global correct: 97.1875%

Classification results per class:
- 100.000%
- 100.000%
- 100.000%
- 88.000%
- 94.000%
- 100.000%

FIG. 6

| # of Classes | CNN | Best Test Accuracy (%) | Input Resolution (pixels) | Color | Drop-out | SN* |
|---|---|---|---|---|---|---|
| 5 | graynet + dropout (50x50) | 92.50 | 50x50 | No | No | Yes |
| 5 | neo2net (86x86) | 94.16 | 86x86 | Yes | No | Yes |
| 5 | neo2net + dropout (86x86) | 94.58 | 86x86 | Yes | Yes | Yes |
| 6 | NoNorm + dropout (86x86) | 96.25 | 86x86 | Color | Yes | No |
| 6 | | 97.92** | 86x86 | Color | Yes | No |

\* SN=Spatial Normalization, an image pre-processing step
\*\* Average of best CNNs across 5 folds.

Systematic evaluation on tuning of CCA demonstrates approx. 98% accuracy on 6-class lithofacies data

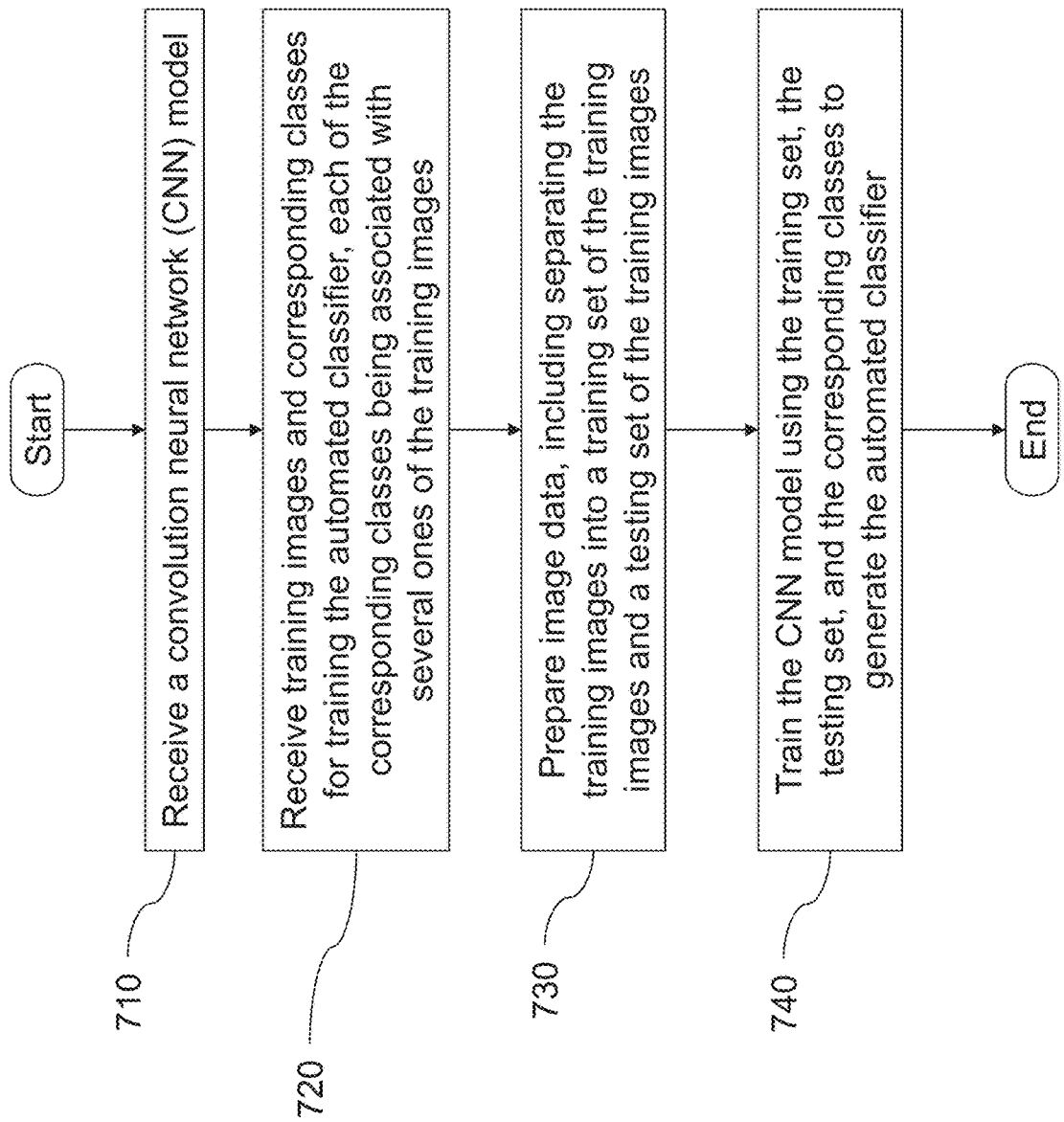

AUTOMATED CLASSIFICATION OF IMAGES USING DEEP LEARNING—BACK END

CROSS-REFERENCE TO RELATED APPLICATION

This application claims priority to and the benefit of U.S. Provisional Appl. No. 62/268,498, filed Dec. 16, 2015, the entire content of which is incorporated herein by reference.

BACKGROUND

1. Field

Aspects of embodiments of the present invention relate to automated classification of images using deep learning.

2. Description of Related Art

Images, especially photographic images, are good examples of inputs for a classification problem. Image classification, and more specifically automated image classification, has been a long-standing topic of interest. However, existing automated tools, such as neural networks, can only assist with the classifying; much of the image classification effort (such as feature selection) still needs to be done by scientists and other experts in the field.

SUMMARY

Aspects of embodiments of the present invention are directed to a novel image classification algorithm and cognitive analysis (CA) system and tool that can characterize and classify images (e.g., ordinary photos, computed tomography (CT) scan photos, images taken in the infrared spectrum, X-Ray images, millimeter wave images, thermal images) rapidly and accurately without requiring feature pre-selection and at a rate not achievable with human intervention. Further aspects provide for confidences in classification. Still further aspects leverage and adapt neuromorphic deep learning-based object recognition methods to classifying images and identifying features therein.

Aspects of embodiments of the present invention are directed to classifying an image by using all of the information in the image automatically and without pre-deciding or pre-selecting what subset of features to consider or other acts requiring human intervention. Further aspects are directed to using the full image as the input, learn which features are most discriminating, and weigh them accordingly and automatically. Accordingly, still further aspects are generalizable to any photo classification problem regardless of the well or the domain. By way of non-limiting example, aspects of embodiments of the present invention are applicable to images of rocks, including core photos, CT scans, thin sections, well-log converted images (e.g., resistivity), etc.

According to one embodiment of the present invention, a method for training an automated classifier of input images includes: receiving, by a processing device, a convolution neural network (CNN) model; receiving, by the processing device, training images and corresponding classes, each of the corresponding classes being associated with several ones of the training images; preparing, by the processing device, the training images, including separating the training images into a training set of the training images and a testing set of the training images; and training, by the processing device, the CNN model utilizing the training set, the testing set, and the corresponding classes to generate the automated classifier.

The training images may be core samples of image formations, the corresponding classes may be lithofacies of the image formations, and the automated classifier may be trained to perform image classification of the input images into the lithofacies.

The CNN model may include multiple layers of convolutional feature extraction operations followed by a linear neural network (NN) classifier.

The CNN model may include multiple convolution stages followed by the linear NN classifier, each of the convolution stages including a convolution filter bank layer to simulate simple cells, a non-linearity activation layer, and a feature pooling layer to simulate complex cells.

The non-linearity activation layer may include a rectified linear unit.

The training of the CNN model may include utilizing backward propagation of errors with stochastic gradient descent.

The preparing of the training images may further include preprocessing the training images prior to the training of the CNN model, the preprocessing including resizing the training images to a canonical size.

The training images may include RGB images and the preprocessing of the training images may further include transforming the canonically-sized RGB images into YUV images.

The preprocessing of the training images may further include spatially normalizing the canonically sized YUV images.

The separating of the training images may include, for each class of the corresponding classes, assigning most of the training images corresponding to the class to the training set and remaining ones of the training images corresponding to the class to the testing set.

The separating of the training images may further include generating several folds, each of the folds being a separation of the training images into a corresponding said training set and said testing set such that no two of the folds share any of the training images between their corresponding said testing sets.

Each of the training images may appear in the testing set of a corresponding one of the folds.

The training set may include a first number of training sets and the testing set may include said first number of testing sets, and the separating of the training images may include: sampling each of the training images for said first number of times; separating the first number of samples from each of the training images of the training set into different ones of the first number of training sets; and separating the first number of samples from each of the training images of the testing set into different ones of the first number of testing sets.

The method may further include: re-training, by the processing device, the CNN model utilizing actual example results via a user interface.

According to one embodiment of the present invention, a system for training an automated classifier of input images includes: a processor; and a non-transitory physical medium, wherein the medium has instructions stored thereon that, when executed by the processor, causes the processor to: receive a convolution neural network (CNN) model; receive training images and corresponding classes for training the automated classifier, each of the corresponding classes being associated with several ones of the training images; prepare the training images, including separating the training images into a training set of the training images and a testing set of the training images; and train the CNN model utilizing the training set, the testing set, and the corresponding classes to generate the automated classifier.

The training images may be of core samples of image formations, the corresponding classes may be of lithofacies of the image formations, and the automated classifier may be trained to perform image classification of the input images into the lithofacies.

The CNN model may include multiple convolution stages followed by a linear neural network (NN) classifier, each of the convolution stages including a convolution filter bank layer to simulate simple cells, a non-linearity activation layer, and a feature pooling layer to simulate complex cells.

The instructions, when executed by the processor, may further cause the processor to prepare the training images by preprocessing the training images prior to the training of the CNN model, the preprocessing including resizing the training images to a canonical size.

The training images may include RGB images and the preprocessing of the training images may further include transforming the canonically-sized RGB images into YUV images.

The separating of the training images may include, for each class of the corresponding classes, assigning most of the training images corresponding to the class to the training set and remaining ones of the training images corresponding to the class to the testing set.

The separating of the training images may further include generating several folds, each of the folds being a separation of the training images into a corresponding said training set and said testing set such that no two of the folds share any of the training images between their corresponding said testing sets.

The training set may include a first number of training sets and the testing set may include said first number of testing sets, and wherein the separating of the training images may include: sampling each of the training images for said first number of times; separating the first number of samples from each of the training images of the training set into different ones of the first number of training sets; and separating the first number of samples from each of the training images of the testing set into different ones of the first number of testing sets.

The system may further include: a user interface to re-train the CNN model utilizing feedback of actual example results from the user interface to improve a performance of the automated classifier.

According to one embodiment of the present invention, an automated classifier of input images includes: one or more integrated circuits configured to implement a trained convolutional neural network (CNN) model, the one or more integrated circuits being configured to: receive an input image; apply the input image to the trained CNN model in a feedforward manner; and output a classification of the input image in accordance with an output of the trained CNN model.

The one or more integrated circuits may include a neuromorphic integrated circuit.

The trained CNN model may be trained by: receiving, by a processing device, training images and corresponding classes, each of the corresponding classes being associated with several ones of the training images; preparing, by the processing device, the training images, including separating the training images into a training set of the training images and a testing set of the training images; and training, by the processing device, the CNN model utilizing the training set, the testing set, and the corresponding classes to generate the automated classifier.

The automated classifier of input images may further include: a user interface for providing feedback regarding the classification of the input image, wherein the trained CNN model may be further trained in accordance the feedback provided via the user interface.

The above and other embodiments of the present invention provide for automated classification of image types from photos and an associated confidence score. This may allow, for example, a project geologist or petrophysicist, regardless of experience or expertise, to help identify key lithofacies for further investigation of "sweet spots" in a rapid timeframe. Embodiments of the present invention have extensive applications within the niche of descriptive geoscience, a highly observation-based science that drives upstream energy sector and markets in the U.S. and worldwide. Embodiments of the present invention also have applications in, for example, the automotive industry (e.g., automated driving, active safety, robotics), aerospace industry (e.g., intelligence, surveillance, and reconnaissance (ISR), border security, unmanned systems, robotics), or other industries, such as geology, petrophysics, geoscience, mining, oil, and natural gas industries (e.g., optimize production).

Further embodiments of the present invention provide for automatically using image data as input and letting an algorithm (such as a computer or artificial neural network or other learning network) learn and extract discriminating features via a deep learning method for subsequent automated classification. Still further embodiments provide for a feature learning capability of deep learning. Yet still further embodiments provide for merging deep learning (such as deep learning networks for image and video surveillance and recognition) with image classification in the same framework. Aspects of these and other embodiments of the present invention are directed to applications of deep learning, network design, learning paradigm, and evaluation of images (such as unprocessed photos) to the classification problem.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, together with the specification, illustrate example embodiments of the present invention. These drawings, together with the description, serve to better explain aspects and principles of the present invention.

FIG. 3 is an example set of training images for training a classifier using images of rock cores according to an embodiment of the present invention.

FIG. 4 is an example training data preparation and multiplication according to an embodiment of the present invention.

FIG. 5, which includes FIGS. 5A-5C, illustrate example training results from implementations of image classification CNNs according to embodiments of the present invention.

FIG. 6 illustrates various CNN network design and parameter tradeoff study examples according to embodiments of the present invention.

FIG. 7 is a flow diagram of an example method for training an automated classifier of input images according to an embodiment of the present invention.

DETAILED DESCRIPTION

Figure 1A:
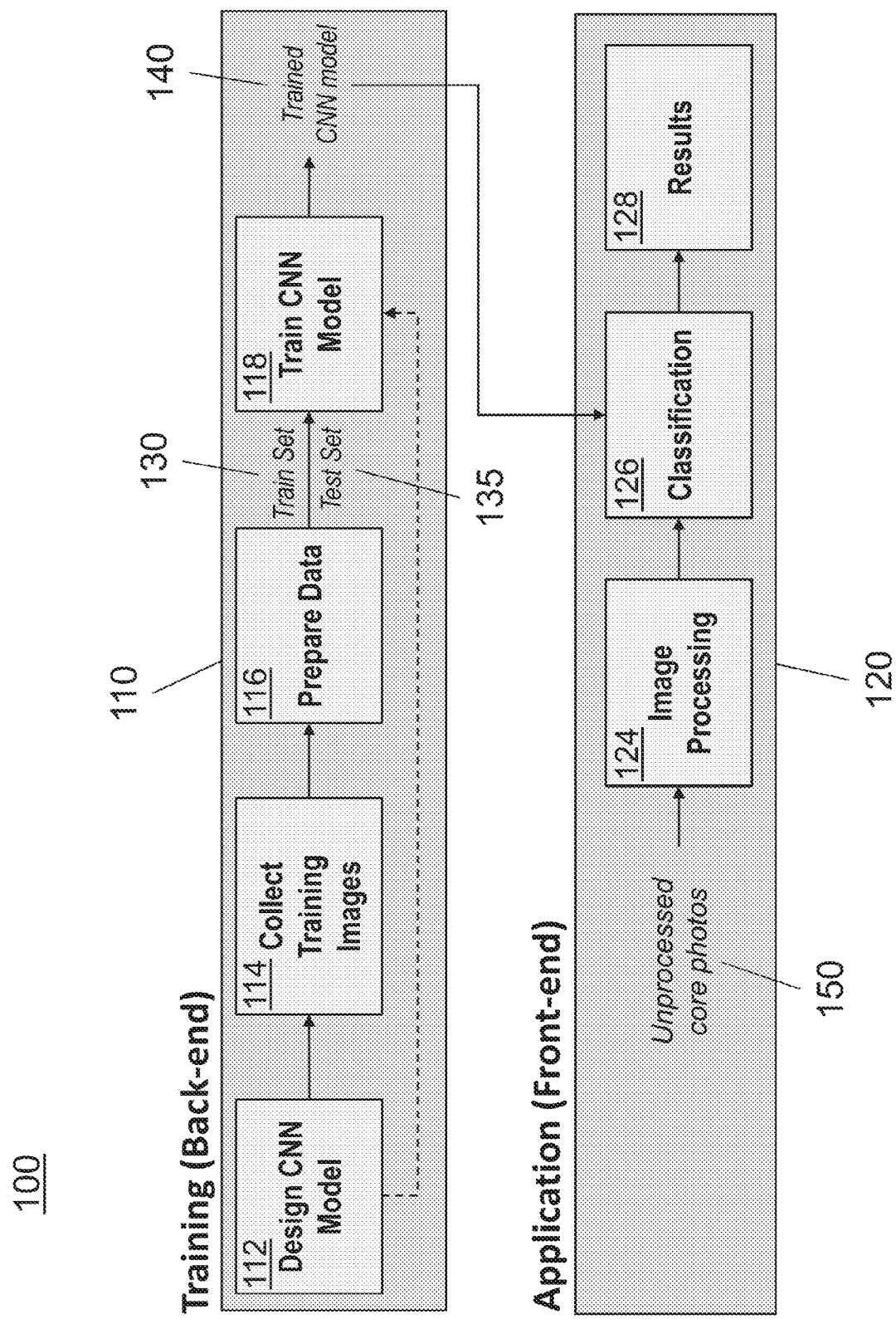
FIG. 1A is a conceptual diagram of an example cognitive analysis (CA) system, including back-end training and front-end application components, according to an embodiment of the present invention.
Figure 1B:
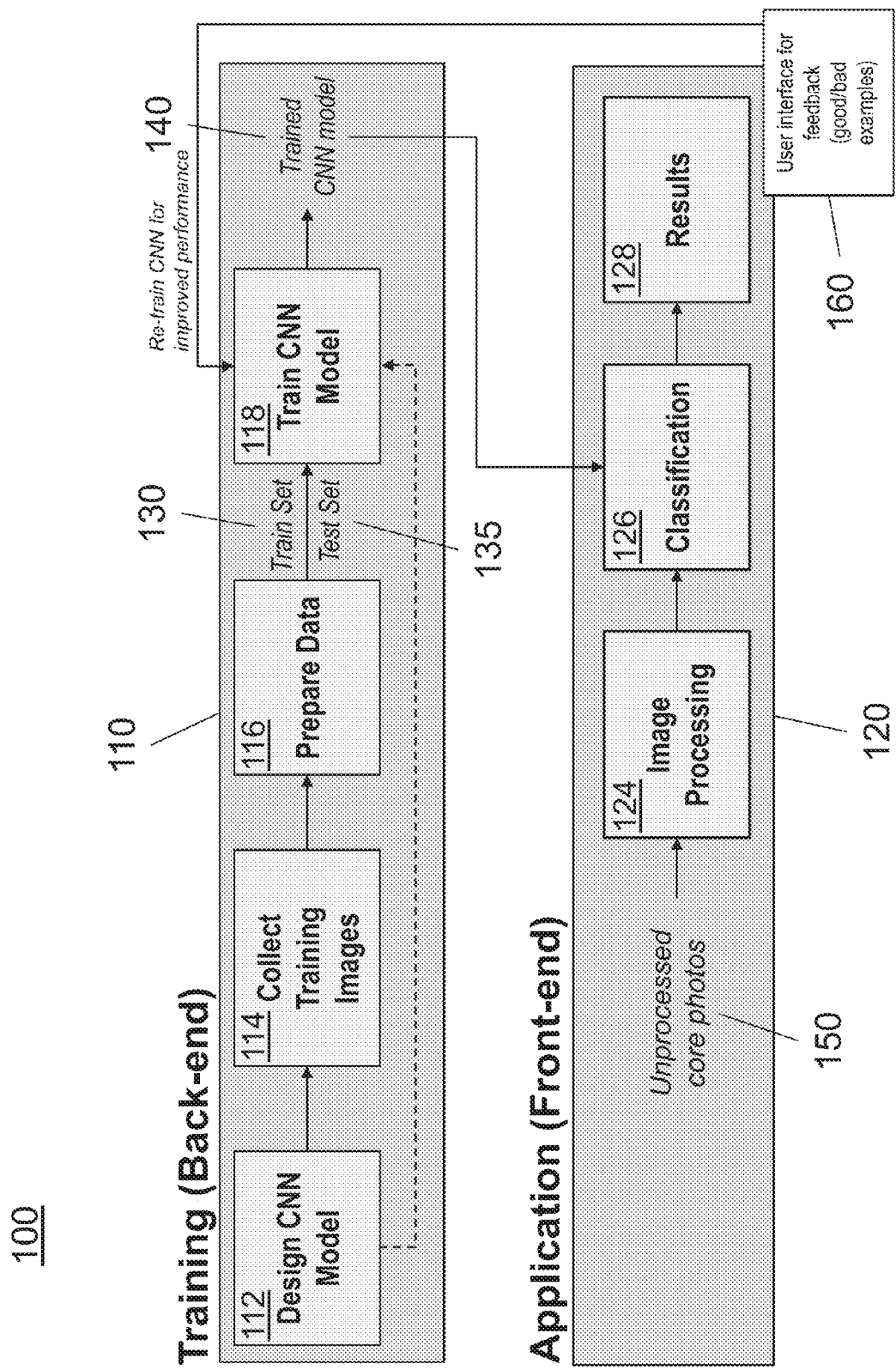
FIG. 1B is a conceptual diagram of an example cognitive analysis (CA) system, including a user interface for feedback of good/bad example results, according to an alternate embodiment of FIG. 1A.

Example embodiments of the present invention will now be described with reference to the accompanying drawings. The present invention, however, may be embodied in various different forms, and should not be construed as being limited to the illustrated embodiments herein. In the drawings, the same or similar reference numerals refer to the same or similar elements throughout. As used herein, the term "substantially," "about," and similar terms are used as terms of approximation and not as terms of degree, and are intended to account for the inherent deviations in measured or calculated values that would be recognized by those of ordinary skill in the art. Herein, the use of the term "may," when describing embodiments according to the principles of the present invention, refers to "one or more embodiments of the present invention." In addition, the use of alternative language, such as "or," when describing embodiments of the present invention, refers to "one or more embodiments according to the principles of the present invention" for each corresponding item listed.

The electronic or electric devices and/or any other relevant devices or components according to embodiments of the present invention described herein may be implemented utilizing any suitable hardware, firmware (e.g. an application-specific integrated circuit (ASIC)), software, or a combination of software, firmware, and hardware. For example, in one embodiment of the present invention, a neuromorphic integrated circuit or neuromorphic chip is used to implement a embodiments of the present invention (see, e.g., the circuit described in U.S. patent application Ser. No. 15/043,478 "Spike Domain Convolution Circuit," the entire disclosure of which is incorporated by reference herein). For example, the various components of these devices may be formed on one integrated circuit (IC) chip or on separate IC chips. Further, the various components of these devices may be implemented, for example, on a flexible printed circuit film, a tape carrier package (TCP), a printed circuit board (PCB), or formed on one substrate. In addition, the various components of these devices may be a process or thread, running on one or more processors, in one or more computing devices, executing computer program instructions and interacting with other system components for performing the various functionalities described herein.

The computer program instructions may be stored in a memory that may be implemented in a computing device using a standard memory device, such as, for example, a random access memory (RAM). The computer program instructions may also be stored in other non-transitory computer readable media such as, for example, a CD-ROM, DVD, flash drive, or the like. In addition, a person of skill in the art should recognize that the functionality of various computing devices may be combined or integrated into a single computing device, or the functionality of a particular computing device may be distributed across one or more other computing devices without departing from the spirit and scope of the present invention.

Embodiments of the present invention are directed to classification systems, such as a cognitive analysis (CA) classification systems, and their corresponding components, such as back-end training and front-end application components. By way of example, CA systems may be directed to classification of rock images, providing an automated system for learning and applying the learning of classification of rock images from, for example, unprocessed photographs (photos) of the rock images to different results.

FIG. 1A is a diagram of an example cognitive analysis (CA) system 100, including back-end training 110 and front-end application 120 components, according to an embodiment according to the principles of the present invention.

Referring to FIG. 1A, the CA system 100 includes back-end training components 110 and front-end application components 120. The training back-end 110 may encapsulate a convolutional neural network (CNN) training process to produce a trained model or classifier 140, while the application front-end 120 may use the trained model 140 to classify images 150 and generate results 128. By way of example, the back-end 110 of the system 100 may handle the design and training of the model 140, while the front-end 120 may take input rock core images 150, run the trained CNN classifier (engine) 140 and output classifications (results) 128. In some embodiments, the model 140 is embodied in a convolutional neural network (CNN) 200.

During the training (back-end) phase 110, several steps may be performed, such as designing a convolutional neural network (CNN) model 112, collecting training images or data 114 for training the model, preparing the image data 116 (including generating a training set 130 of images for training the model and a testing set 135 of images for verifying the model), and training the CNN model 118 using the training set 130 and the testing set 135 of images to generate a trained model 140 including a CNN 200. During the application (front-end) phase 120, further steps may be performed such as performing image processing 124 on unclassified photos 150 (e.g., rock formation unclassified images) to create input for a classifier (such as the trained model 140), performing the classification 126 on the unclassified images using the model 140, and providing results 128 (e.g., classifications) from the application 120.

A convolutional neural network (CNN) is a supervised deep-learning neural network with multiple layers of similarly structured convolutional feature extraction operations followed by a linear neural network (NN) classifier. CNNs may be used for image recognition through automatic learning of image features. A CNN may include alternating layers of simple and complex computational cells analogous to a mammalian visual cortex. In a CNN, simple cells may perform template matching and complex cells may pool these results to achieve invariance. See, e.g., LeCun, Y., Kavukcuoglu, K., and Farabet, C. (2010), Convolutional Networks and Applications in Vision, *International Symposium on Circuits and Systems* (*ISCAS* '10), IEEE, Paris, 2010, and U.S. patent application Ser. No. 15/043,478 "Spike Domain Convolution Circuit," the entire contents of which are incorporated herein by reference, for further description of CNNs.

Figure 2:
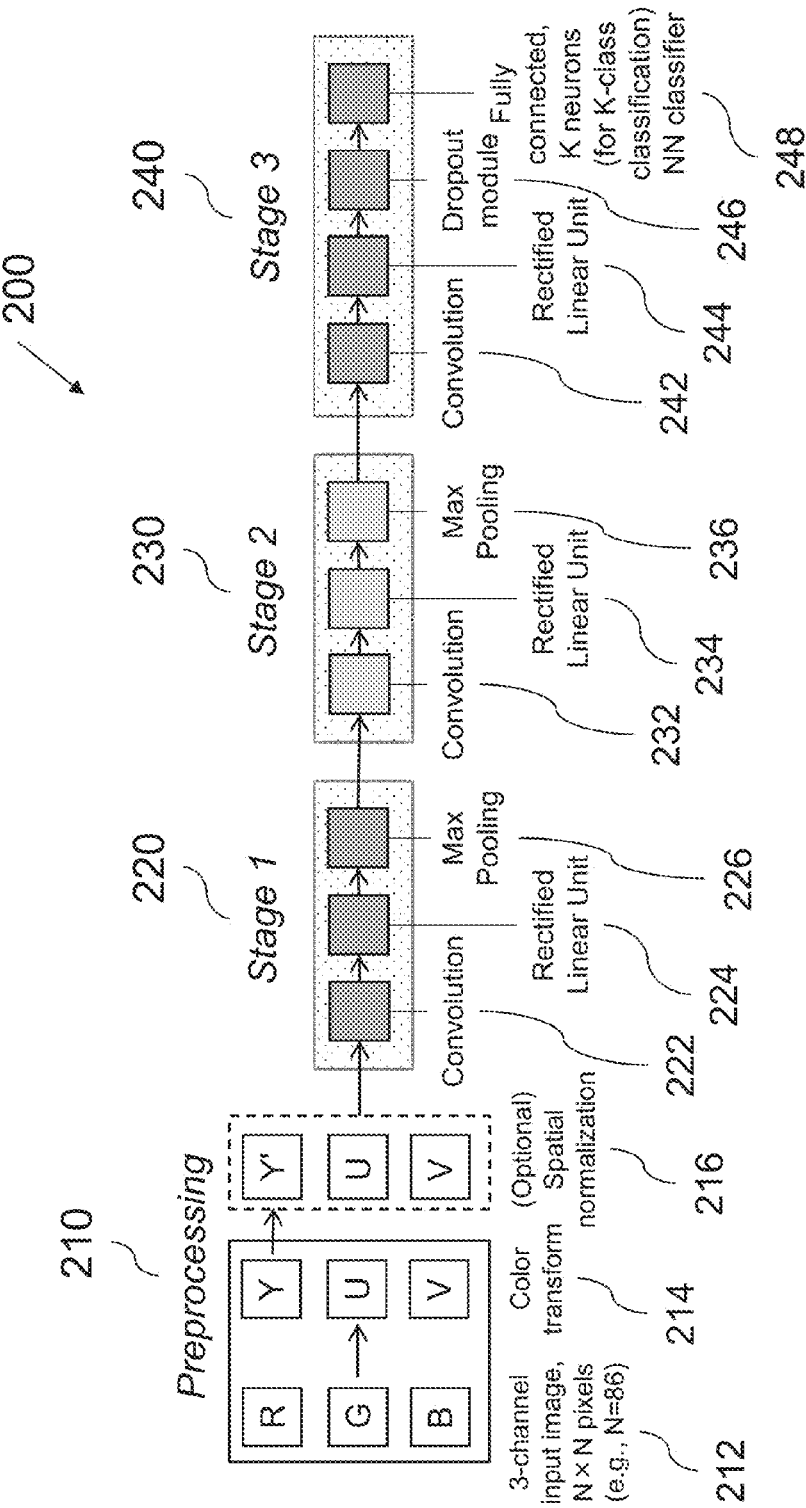
FIG. 2 is a block diagram of an example convolutional neural network (CNN) architecture for image classification according to an embodiment of the present invention.

For example, a CNN 200 as shown in FIG. 2 may have several 3-layer convolution stages 220, 230 followed by a four layer classifier stage 240 that is a linear Neural Network (NN) with one or more hidden layers. Generally, in a linear neural network, the neurons in one layer perform computations that are linear functions of their inputs (e.g., the form:

$$y_i = \sum_j w_{ij} y_j$$

where $y_i$ is the output of the i-th neuron, $y_j$ is the input from the jth input neuron, and $w_{ij}$ is the weight associated with the connection from the j-th neuron to the i-th neuron) and supply these computed outputs to a successive layer of neurons, or in the case of the last layer, an output neuron representing the output of the neural network (see, e.g., Basheer, I. A., and M. Hajmeer. "Artificial neural networks: fundamentals, computing, design, and application." *Journal of microbiological methods* 43.1 (2000): 3-31.). Each convolution stage 220, 230 may have three layers: 1) a filter bank layer (Convolution) 222, 231 to simulate simple cells (e.g., using a separate feature map and the convolution operator to identify a particular feature anywhere in the input image for each feature of interest), 2) a non-linearity activation layer (Rectified Linear Unit) 224, 234, and 3) a feature pooling layer (Max Pooling) 226, 236 to simulate complex cells. The entire network may be trained using backpropagation (backward propagation of errors) with stochastic gradient descent (an optimization algorithm, see, e.g., LeCun, Yann A., et al. "Efficient backprop." *Neural networks: Tricks of the trade*. Springer Berlin Heidelberg, 2012. 9-48). Due to its feedforward nature (non-recursive) and uniform computation within each convolution stage, CNNs such as these may be computationally very efficient.

In another embodiment of the present invention, a user interface 160 is included for providing a feedback. Here, the actual classification results (good and/or bad) can be fed back to the trainer (the CNN model 118) so that the trainer can learn (re-train) from its actual (operational) successes/failures (instead of only from its training successes/failures). As such, using this user feedback of the actual classification results to retrain the CNN model 118 the model 140 and/or the CA system 100 can continuously improve its performance.

FIG. 2 is a block diagram of an example convolutional neural network (CNN) 200 in a rock classification context according to an embodiment of the present invention. While one example embodiment of the invention is described with respect to FIG. 2 in the context of rock classification, embodiments of the present invention are not limited thereto, and may be applied to classify images in other contexts, such as in the automotive industry (e.g., materials analysis), in aerospace, in intelligence, surveillance, and reconnaissance (e.g., analysis of aerial views), and in the classification of other natural phenomena (e.g., textured surfaces such as plants, clouds, etc.).

For example, the CNN 200 of FIG. 2 may perform image classification (e.g., lithofacies) from images (e.g., photos) of rock (e.g., wellbore core). Referring to FIG. 2, a 3-stage CNN 200 (including first stage 220, second stage 230, and third stage 240) may be used, though more stages may be used for a high-dimensional classification application. To prepare the data, a preprocessing module 210 may be used, where input RGB (red green blue) color images may be resized to a canonical size of N×N pixels 212 (such as N=86) regardless of their original aspect ratio.

In other embodiments, the RGB image may be transformed to a YUV color space 214 (where Y represents a luminance or perceived brightness component and UV represents chrominance (color) components). Further, the YUV image may be spatially normalized 216 (e.g., the Y channel may be processed by local subtractive and divisive normalization, such as to a Y'UV color space, where Y' is a luma, radiance, or electronic (voltage) brightness component).

For example, for the N=86 case, the convolution layer (filter bank) 222 of the first stage 220 may have 8 convolution filter kernels (e.g., corresponding to 8 different features). Each of the 8 convolution filter kernels may be a block of 7 by 7 pixels along with 8 feature maps of 80 by 80 pixels apiece. The convolution layer 222 is followed by an activation function (non-linearities) 224 (e.g., Rectified Linear Unit or ReLU, such as f(x)=max(0,x)) and max-pooling (feature pooling) 226 of 8 kernels in 4 by 4 pixel neighborhoods and subsampling with a stride of 4 pixels, resulting in 8 feature maps of 20 by 20 pixels each at the end of the first stage 220. Note that other activation functions such as sigmoid or tanh( ) may be used in other embodiments. In image classification applications, ReLU may help the network to converge quickly and with higher accuracy during training.

In the second stage 230, the convolution layer 232 may have 128 convolution filter kernels of 7 by 7 pixels each along with 32 feature maps of 14 by 14 pixels apiece, The convolution layer 232 is followed by an ReLU layer 234 and max-pooling 236 of 32 kernels in 2 by 2 pixel neighborhoods with subsampling, resulting in 32 feature maps of 7 by 7 pixels each at the end of the second stage 230.

In the third stage 240, the convolution layer 242 may have 2048 convolution filter kernels of 7 by 7 pixels each along with 128 feature maps of 1 by 1 pixels apiece (e.g., a 128-D vector), which is then fed to the Rectified Linear Unit layer (e.g., ReLU) 244. The Rectified Linear Unit 244 (see, e.g., Nair, Vinod, and Geoffrey E. Hinton. "Rectified linear units improve restricted boltzmann machines." *Proceedings of the 27th International Conference on Machine Learning (ICML-10)*. 2010.) is followed by a dropout module 246 (to reduce overfitting, such as too tight a correlation on the actual training images versus ability to properly classify non-training images) and a fully-connected linear NN classifier 248. For example, the NN classifier 248 may be a 6-neuron classifier (e.g., 6-output neuron classifier) configured to classify image images into one of six classes (e.g., one output neuron for each class).

To train a CNN, such as the CNN 200 illustrated in FIG. 2 above, for image classification, training images or data (such as training data 114 of FIG. 1A) are used for each of the different classes that the classifier is intended to classify. See, for example, FIG. 3 and description below. It should be noted that while image classification (and more specifically, image strata or lithofacies from, for example, core samples/photos) is described throughout the present application, this is but one example embodiment, and other embodiments of the present invention are not limited thereto. For example, other embodiments may be directed to the classification of different types of images or photos.

Returning to image classification, the CNN may use the training data to develop a parametrized network or model (such as a classifier) that can discriminate among a set of classes. The model or classifier may benefit from a training set of images that contains samples representative of each class under a variety of conditions. This set may be collected, for example, by a human annotator (subject matter expert) who creates a reference dictionary of images representing a manual descriptive workflow.

The network (e.g., CNN 200) may learn from an arbitrary size of data (such as an arbitrary number of images of each class) as well as be extended to label an arbitrary number of classes. Note too, that the set may contain arbitrary sizes of images (e.g., different resolutions or aspect ratios) that, according to some of the embodiments of the present invention, may be fully exploited according to the data partitioning (e.g., preprocessing stage 210) scheme discussed above with reference to FIG. 2 (for example, converting each image to a consistent resolution, such as 86×86 pixels).

FIG. 3 is an example set of training images for training a classifier to classify rocks using a image classification CNN according to an embodiment of the present invention.

Referring to FIG. 3, for ease of description, there are a collection of approximately 25 images for each of two classes of lithofacies (Bioturbated 320 and Horizontal Laminated 330) out of a potential of 6 classes 310 (further including Black Shale, Debris Flow, Buff Sandstone, and Gray Limestone) present in a core sample.

FIG. 4 is an example training data preparation and multiplication according to an embodiment of the present invention. The training data (such as that from FIG. 3) is prepared for training the CNN.

Referring to FIG. 4, training data 410 (e.g., approximately 25 images for each represented class) is divided (for example, randomly divided) into two groups, a training set 420 (or learning set) and a testing set 430 (or validation set) for training the CNN. For example, the division may be 80/20 (or 80% and 20%), or approximately 20 images per class for the training set and 5 images per class for the testing set when the class is represented by about 25 images. It should be noted that for such a division of exactly 25 training images 410, five such divisions (or folds) may be performed without having to repeat the same training image for multiple testing sets 430. Such a group of five training sets 420 and testing sets 430 may be referred to as a five-fold validation (or an N-fold validation with N=5), where each of the training images takes part in one of the testing sets 430 for one of the folds.

Deep learning neural networks, such as the CNN 200 of FIG. 2, may further benefit from training with large amounts of training data (e.g., several hundred training images for each class). However, as training images may be hand selected by subject matter experts from limited pools of possible training images to produce a good cross-section (representation) of each class, actual training data may be limited to only a few dozen (e.g., 25) images per class. Accordingly, data multiplication techniques may be used to increase the pool of training images several times (e.g., 10× or 10 times, such as from 25 training images to 250 training images split as 200 images in training sets 420 and 50 images in testing sets 430 for each of the folds).

To generate these larger numbers of training images, each of the existing training images may in turn be randomly sampled (e.g., a representative portion, such as a sub-image or other contiguous portion). For example, K× sampling (such as 10× sampling 460 for K=10) may be performed on each fold to obtain a larger distribution of training images, where each of the 25 training images is sampled (e.g., randomly sampled, such as uniformly randomly sampled) ten times (for the 10 training sets and the 10 corresponding testing sets). This produces 200 images in the training sets 440 and 50 images in the testing sets 450 for each fold, with no two of the images being the same, though samples from the same image may overlap in portions. The process may then be repeated for each of the other classes (and their corresponding training images and folds).

As one example embodiment of this data multiplication or sampling, let the canonical input image size processed by the CNN be N×N, where N is, for example, the minimum width and height of the input image in order for the CNN to generate one output classification (e.g., N=86). Further, let W×H be the size of a particular input training image A. It is often the case that W>>N and H>>N (for example, W and H may be several hundred or even thousands of pixels, while N may be less than 100, such as N=86). In this case, one technique for sampling or extracting multiple (say K) images from the same training image is to extract K sub-images of size bN×bN randomly (e.g., having different (and randomly located) centers) from A, where b is, for example, some small constant greater than 1, such as 1.25.

This process yields K new training images for each original training image for each fold. For example, if K=10, the 10× sampling 460 described above may be implemented by sampling 10 separate sub-images (of size bN×bN) for each of the training images, and assigning each such sample to a different corresponding training set or testing set. The resulting K training images of size bN×bN are still larger than the canonical size of N×N of the CNN. This allows, for example, further training data augmentation by repeating this technique on the fly during training, only this time extracting sub-images (e.g., N×N sub-images) randomly from each of the K new training images (of size bN×bN).

FIG. 5, which includes FIGS. 5A-5C, illustrate example training results from implementations of image classification CNNs according to embodiments of the present invention.

For these results, as discussed above, five folds of data are used, where each fold contains 200 training images and 50 test images (e.g., 10× sampling of 20 training images and 5 test images for each fold). The CNN is then trained using these folds. Results from each fold are saved and analyzed to determine the best performing CNN (as compared to comparable CNNs). Results from two such training folds are illustrated in FIGS. 5A-5B. In FIGS. 5A-5B, the x-axis represents training iterations while the y-axis represents accuracy (in percent). There are two accuracy plots in each figure, a training accuracy (510 in FIG. 5A and 530 in FIG. 5B) and a testing accuracy (520 in FIG. 5A and 540 in FIG. 5D).

In FIG. 5C, confusion matrix results from the best performing CNN from select training runs of two different folds are shown, with perfect classification in all but one or two of the classes, and average classification accuracies in the 97-99% range. In the confusion matrices of FIG. 5C, columns represent predicted classes by the CNN while rows represent the actual classes. Thus, diagonal entries represent correct predictions while incorrect predictions are tallied for each possible actual class and predicted class.

FIG. 6 illustrates various CNN network design and parameter tradeoff study examples according to embodiments of the present invention.

Referring to FIG. 6, tradeoff study parameters for CNN design and optimization in embodiments of the present invention include: image resolution (e.g., 86×86 vs. 50×50 pixels); image color (e.g., color or grayscale image); image pixel normalization (e.g., with or without normalization); dropout (e.g., dropout or no dropout). Best performance was achieved without normalization on 86×86 color images with dropout. This is the CNN network shown in FIG. 2. Other embodiments may use various other network parameters but may suffer from sub-optimal classification accuracy. Once the CNN has been trained, the network specification file is ready and may be applied to any photo for automated classification.

Embodiments of the present invention are directed toward improving applicability of the CNN to core photo classification.

FIG. 7 is a flow diagram of an example method for training an automated classifier of input images according to an embodiment of the present invention.

The above and other methods disclosed herein may be implemented, for example, as a series of computer instructions to be executed by a processor (or other computing device), such as a microprocessor, or two or more processors. The processor(s) may execute computer program instructions and interact with other system components for performing the various functionalities described herein. The computer program instructions may be stored in a memory implemented using a standard memory device, such as, for example, a random access memory (RAM). The computer program instructions may also be stored in other non-transitory computer readable media such as, for example, a CD-ROM, flash drive, or the like. The methods may also be implemented using hardware circuits (e.g., transistors, capacitors, logic gates, FPGAs, etc.), or combinations of hardware circuits, software, and firmware, as would be apparent to one of ordinary skill.

Referring to FIG. 7, in step 710, a processing device (such as a computer processor or microprocessor) for training the automated classifier receives a convolution neural network (CNN) model. For example, the CNN model may be similar to the model described above with reference to FIG. 2. In addition, in step 720, the processing device receives training images and corresponding classes for training the automated classifier, each of the corresponding classes being associated with several ones of the training images. For example, the training images may be as described above with reference to FIG. 3.

In step 730, the processing device processes the training images, including separating the training images into a training set of the training images and a testing set of the training images. For example, the separation may be as described above with reference to FIG. 4. In step 740, the processing device trains the CNN model using the training set, the testing set, and the corresponding classes to generate the automated classifier. For example, the processing device may use backpropagation (backward propagation of errors) to train the CNN model.

While the present invention has been described in connection with certain example embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for training an automated classifier of input images, the method comprising:
   receiving, by a processing device, a convolution neural network (CNN) model;
   receiving, by the processing device, training images and corresponding classes, each of the corresponding classes being associated with several ones of the training images;
   preparing, by the processing device, the training images, comprising separating the training images into a training set of the training images and a testing set of the training images; and
   training, by the processing device, the CNN model utilizing the training set, the testing set, and the corresponding classes to generate the automated classifier,
   wherein the CNN model comprises multiple layers of convolutional feature extraction operations followed by a linear neural network (NN) classifier, and
   wherein the CNN model comprises multiple convolution stages followed by the linear NN classifier, each of the convolution stages comprising a convolution filter bank layer, a non-linearity activation layer, and a feature pooling layer.

2. The method of claim 1, wherein the non-linearity activation layer comprises a rectified linear unit.

3. The method of claim 1, wherein the training of the CNN model comprises utilizing backward propagation of errors with stochastic gradient descent.

4. The method of claim 1, wherein the preparing of the training images further comprises preprocessing the training images prior to the training of the CNN model, the preprocessing comprising resizing the training images to a fixed size.

5. The method of claim 4, wherein the training images comprise RGB images and the preprocessing of the training images further comprises transforming the RGB images having the fixed size into YUV images.

6. The method of claim 5, wherein the preprocessing of the training images further comprises spatially normalizing the YUV images having the fixed size.

7. The method of claim 1, wherein the separating of the training images comprises, for each class of the corresponding classes, assigning a majority of the training images corresponding to the class to the training set and remaining ones of the training images corresponding to the class to the testing set.

8. The method of claim 7, wherein the separating of the training images further comprises generating several folds, each of the folds being a separation of the training images into a corresponding said training set and said testing set such that no two of the folds share any of the training images between their corresponding said testing sets.

9. The method of claim 8, wherein each of the training images appears in the testing set of a corresponding one of the folds.

10. The method of claim 1,
    wherein the training set comprises a first number of training sets and the testing set comprises said first number of testing sets, and
    wherein the separating of the training images comprises:
       sampling each of the training images for said first number of times;
       separating the first number of samples from each of the training images of the training set into different ones of the first number of training sets; and
       separating the first number of samples from each of the training images of the testing set into different ones of the first number of testing sets.

11. The method of claim 1, further comprising:
    re-training, by the processing device, the CNN model utilizing actual example results via a user interface.

12. A system for training an automated classifier of input images, the system comprising:
    a processor; and
    a non-transitory physical medium, wherein the medium has instructions stored thereon that, when executed by the processor, causes the processor to:
       receive a convolution neural network (CNN) model;

receive training images and corresponding classes for training the automated classifier, each of the corresponding classes being associated with several ones of the training images;

prepare the training images, comprising separating the training images into a training set of the training images and a testing set of the training images; and train the CNN model utilizing the training set, the testing set, and the corresponding classes to generate the automated classifier, wherein the CNN model comprises multiple convolution stages followed by a linear neural network (NN) classifier, each of the convolution stages comprising a convolution filter bank layer, a non-linearity activation layer, and a feature pooling layer.

13. The system of claim 12, wherein the instructions, when executed by the processor, further cause the processor to prepare the training images by preprocessing the training images prior to the training of the CNN model, the preprocessing comprising resizing the training images to a fixed size.

14. The system of claim 13, wherein the training images comprise RGB images and the preprocessing of the training images further comprises transforming the RGB images having the fixed size into YUV images.

15. The system of claim 12, wherein the separating of the training images comprises, for each class of the corresponding classes, assigning a majority of the training images corresponding to the class to the training set and remaining ones of the training images corresponding to the class to the testing set.

16. The system of claim 15, wherein the separating of the training images further comprises generating several folds, each of the folds being a separation of the training images into a corresponding said training set and said testing set such that no two of the folds share any of the training images between their corresponding said testing sets.

17. The system of claim 12,
wherein the training set comprises a first number of training sets and the testing set comprises said first number of testing sets, and
wherein the separating of the training images comprises:
sampling each of the training images for said first number of times;
separating the first number of samples from each of the training images of the training set into different ones of the first number of training sets; and
separating the first number of samples from each of the training images of the testing set into different ones of the first number of testing sets.

18. The system of claim 12, further comprising:
a user interface to re-train the CNN model utilizing feedback of actual example results from the user interface to improve a performance of the automated classifier.

19. An automated classifier of input images comprising:
one or more integrated circuits configured to implement a trained convolutional neural network (CNN) model, the one or more integrated circuits being configured to:
receive an input image;
apply the input image to the trained CNN model in a feedforward manner; and
output a classification of the input image in accordance with an output of the trained CNN model,
wherein the trained CNN model comprises multiple convolution stages followed by a linear neural network (NN) classifier, each of the convolution stages comprising a convolution filter bank layer, a non-linearity activation layer, and a feature pooling layer.

20. The automated classifier of input images of claim 19, wherein the one or more integrated circuits comprise a neuromorphic integrated circuit.

21. The automated classifier of input images of claim 19, wherein the trained CNN model is trained by:
receiving, by a processing device, training images and corresponding classes, each of the corresponding classes being associated with several ones of the training images;
preparing, by the processing device, the training images, comprising separating the training images into a training set of the training images and a testing set of the training images; and
training, by the processing device, the CNN model utilizing the training set, the testing set, and the corresponding classes to generate the automated classifier.

22. The automated classifier of input images of claim 21, further comprising:
a user interface for providing feedback regarding the classification of the input image,
wherein the trained CNN model is further trained in accordance the feedback provided via the user interface.

* * * * *